No. 702,024. Patented June 10, 1902.
R. B. MOORE.
HOOP LUG.
(Application filed Mar. 4, 1902.)
(No Model.) 2 Sheets—Sheet 1.

Witnesses,

Inventor,
Robert B. Moore

No. 702,024. Patented June 10, 1902.
R. B. MOORE.
HOOP LUG.
(Application filed Mar. 4, 1902.)
(No Model.) 2 Sheets—Sheet 2.
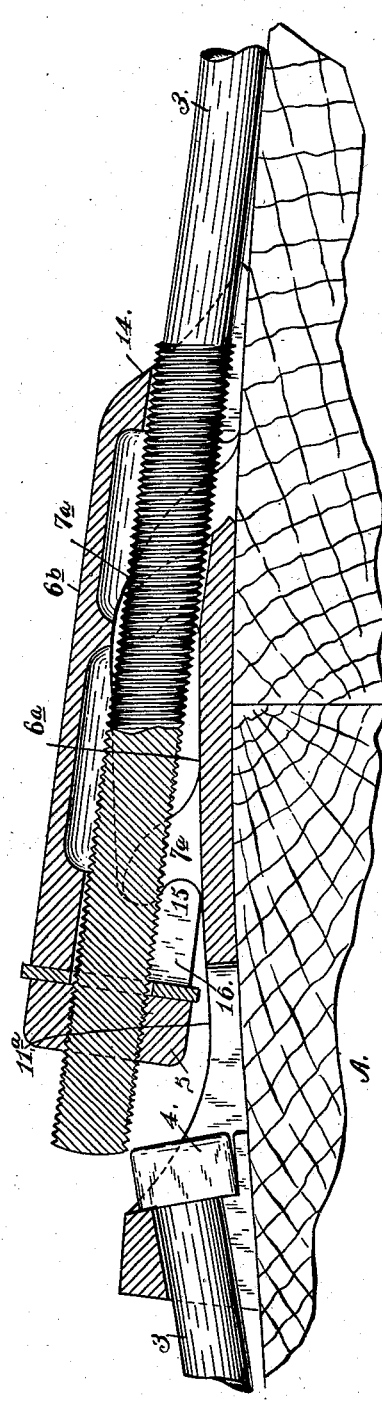
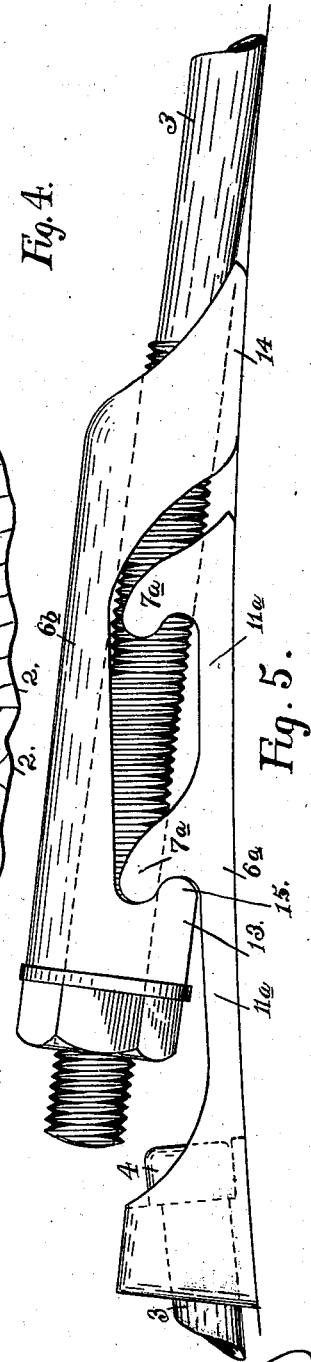
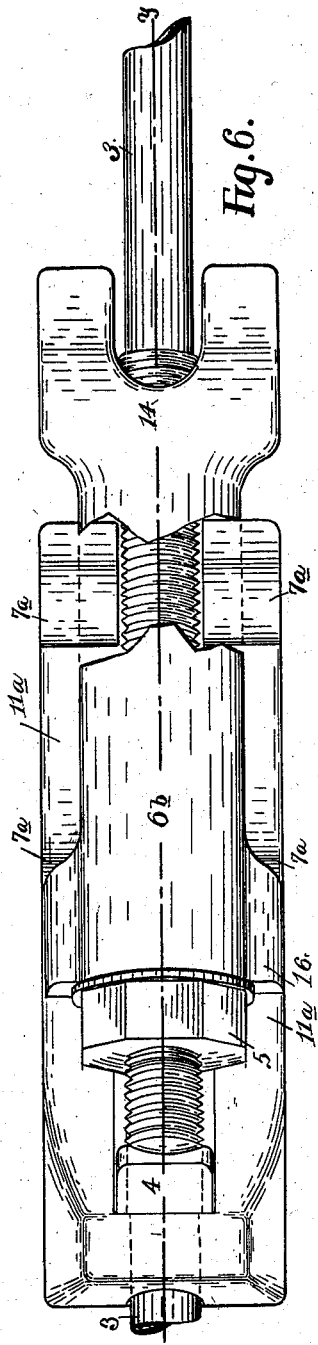
Witnesses, Inventor,
Robert B. Moore

UNITED STATES PATENT OFFICE.

ROBERT B. MOORE, OF SAN FRANCISCO, CALIFORNIA.

HOOP-LUG.

SPECIFICATION forming part of Letters Patent No. 702,024, dated June 10, 1902.

Application filed March 4, 1902. Serial No. 96,579. (No model.)

*To all whom it may concern:*

Be it known that I, ROBERT B. MOORE, a citizen of the United States, residing in the city and county of San Francisco, State of California, have invented an Improvement in Hoop-Lugs; and I hereby declare the following to be a full, clear, and exact description of the same.

My invention relates to improvements in adjustable hoop lugs or couplings. Its object is to provide a simple device by which the ends of hoops or rods used to hold the staves or like component parts of barrels, tanks, conduits, &c., together are united and whereby the proper adjustment of said ends may be more readily effected than by the couplings ordinarily employed.

It consists, essentially, of a lug or coupling-block having one end adapted to embrace the head end of a hoop-bolt, a plurality of bifurcated radially-disposed projections on said block, and means by which the opposite end of the bolt is adapted to be engaged, guided, and held between said projections, which latter serve as a means for adjusting the length of said bolt.

It comprises modifications and details which will be more fully set forth hereinafter, having reference to the accompanying drawings, in which—

Figure 1:
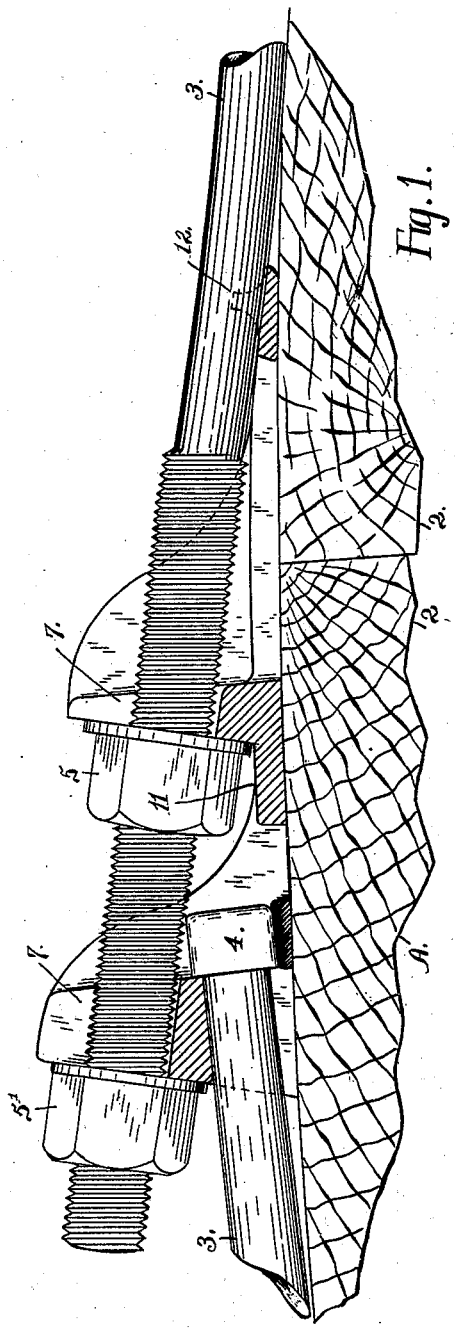
Figure 2:
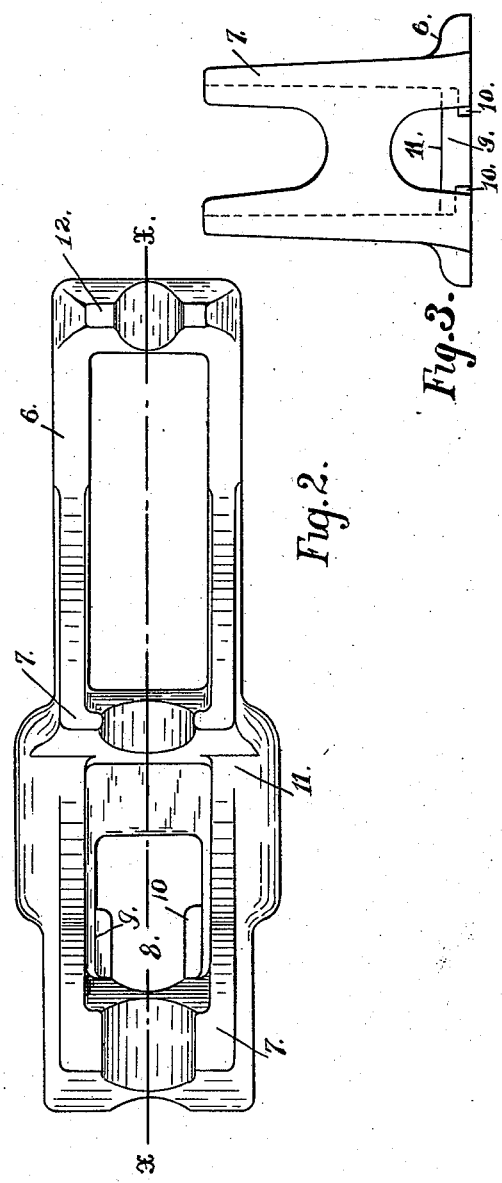
Figure 3:
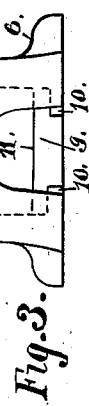

Figure 1 is a sectional view of my improved hoop-lug, taken on the line $xx$ of Fig. 2. Fig. 2 is a top view of same. Fig. 3 is a front view of same. Fig. 4 is a sectional view of a modification taken on line $y y$ of Fig. 6. Fig. 5 is a side view of same. Fig. 6 is a top view of same.

In Figs. 1, 2, and 3, A represents a section of a tank, conduit, or other tubular structure made up of the elements or staves 2 and held together by the hoop or securing-rods 3. One end of a rod or bolt 3 is provided with a head 4, and the other end is threaded and adapted to receive a washer and nut 5.

The coupling or lug consists of a block or plate 6, longitudinally concaved to fit the contour of the tank and provided with a plurality of outwardly-extending projections or stop members 7. The latter are bifurcated in the line of the axis of the lug, and the bifurcations are adapted to straddle the threaded end of the bolt. On the under side of one end of the lug a slot or eye 8 is formed, into which the headed end of the bolt may be slipped. The lug is chamfered out, as at 9, intermediate of the projections 7, and the vertical wall of the channel so formed, adjacent to the eye, affords a seat for the head. Two narrow horizontal ledges 10, one on either side of the channel 9 and separated a space greater than the diameter of the bolt, (whereby the bolt may be passed up between them,) serve to engage the under side of the bolt-head when the latter is drawn forward to its seat. These ledges prevent the bolt from being accidentally disengaged from the lug when the workman is bringing the ends of the bolt together, as so frequently happens with lugs which do not have such ledges or equivalent stop means, but depend on tension to retain the bolt in the slot. Again, this mode of locking the bolt-head is preferable to forming the head of the lug with a round eye, through which it is necessary to run the whole rod in order to get the lug seated against the bolt-head. In operation one of these bolts, which may vary from three to one hundred feet or more in length, according to the size of the tank for which it is intended, is placed in position around the tank and its threaded end inserted between the bifurcated portions of the projections 7. The longer rods are in sections, with interposed lugs between the sections. The nut 5, with its washer, is then locked against one or the other of the projections. In practice when a tank is first put up the nut will be tightened against the rearmost of the projections. If subsequently the hoop becomes loosened, instead of taking off the nut and building up against the stop with a number of washers for a distance of several inches, as is customary now where only a single lock-stop 7 is used, I have but to screw a second nut 5' onto the end of the bolt and tighten it against the outer projection, thus avoiding the necessity of slackening the first nut, and so allow the bolt to fall from or become displaced on the tank.

This device affords not only a neater appearance than if it were necessary to take up slack by means of washers alone, but it offers a firmer seat for the nut and gives a wide range of adjustment.

While I have only shown two stop members 7, it is obvious that by prolonging the length of the block I could form as many of these projections thereon as I saw fit.

Practically the limit to which these bolts can be upset (which part only is threaded) is about six inches. Consequently each additional stop is equivalent to so much additional threaded length of bolt, or, differently put, it saves the expense of having a bolt especially threaded for a special length, which latter may vary but a few inches from that of a bolt on hand, but which cannot by any means be made to fit in this particular instance if a lug with only one stop is used. Moreover, by making the lug of malleable metal and leaving the portion 11 between the stops sufficiently thin consistent with necessary strength, so that it may bend when the rod is tightened, the coupling readily accommodates itself to arcs of different radii, and so practically one size of lug will serve for all sizes of tanks. The lesser projections 12 at the rear end of the coupling engage the bolt on either side and preserve the proper alinement of the bolt and lug.

In Figs. 4, 5, 6 I have represented a modified form of my invention, which shows the same principle of a plurality of stops affording lengthwise adjustment and also the same form of eye for engaging the head of the bolt and ledges for retaining said head in the eye. In this case the coupling or lug comprises two members $6^a$ and $6^b$. The former consists of a block or plate having the projections or stop members $7^a$. The locking projections or stops $7^a$ are arranged in pairs, and there may be one or more pairs, according to the length of the plate and the size of the tank. These stops are rounded at their ends and have their forward walls concaved or notched, as shown. The coupling member $6^b$ consists of a block having an elongated body portion with the bifurcated front and rear end projections 13 and 14, respectively, which are adapted to straddle the threaded end of the rod 3. The rear walls of the projections 13 are concaved or notched and shaped to form the rounded hooks 15, which are complements of the members or hooks $7^a$ on the coupling member $6^a$. The space intermediate of the projections 13 and 14 is adapted to accommodate the hooks $7^a$, so that the member $6^b$ may overlap and engage the member $6^a$, and the projections 14 are made always to bear against the side of the tank. Accordingly the length of one member is always proportionate to that of the other, as it is intended that the span between the front and rear end projections 13 and 14 of the member $6^b$ should be able to include all the hooks $7^a$, as when the coupling is in its shortened position, as shown. In operation the member $6^a$, suitably engaged on the headed end of the hoop-rod, is placed against the tank. The threaded end of the rod, with the washer and nut 5 in position, is inserted into the eye portion 16 of the member $6^b$, with the bifurcated projection 14 straddling the rod. The two members are then made to engage by means of the interlocking hooks 15 and one or other of the pairs of hooks $7^a$. The hoop is then tightened by screwing up the nut 5. An important feature of this form of the invention is that when the members are thus interlocked and the hooks $7^a$ and 15 engaging on either side of the rod, as they do, the rod itself serves to preserve the alinement and to prevent any lateral displacement of the parts, rendering any other guide means unnecessary. The hooks $7^a$ and 15 being shaped and curved as shown serve as knuckle-joints, whereby the coupling members readily adjust themselves to tanks of varying sizes. The portion $11^a$ of the member $6^a$ is sufficiently shallow to allow the lug to conform to the contour of the tank when the bolt is tightened. By this device both ends of the rod are brought into proper alinement and are brought closer to the periphery of the tank than in most devices of a similar nature, and consequently no considerable portion of even a single stave is unsupported. If subsequently the hoop becomes loosened, the relative position of the members may be shifted and the nut turned accordingly, so that this device practically affords a double means of adjustment.

In tightening these bolts they are put to a strain nearly equal to their tensile strength. As a result it not infrequently happens that a nut splits or the thread will be stripped or the corners of the nut will become rounded, so that a wrench will not hold. An obvious advantage following from the use of a lug of the character shown in Fig. 1 is that two nuts 5 5' may be placed on the bolt at the same time and tightened gradually against each of the projections. The strain on each nut can therefore be made to be but a part of what it would be were a single nut used, and the actual threaded surface of the bolt engaged is doubled.

Having thus described my invention, what I claim, and desire to secure by Letters Patent, is—

1. In a hoop-coupling, a coupling-block having one end adapted to embrace the head of a hoop-bolt, a plurality of bifurcated radially-disposed projections on said block, and means whereby said bolt may be held behind one or the other of said projections.

2. In a hoop-coupling, a coupling-block having a plurality of outwardly-extending projections arranged in pairs along the length of said block, said block adapted at one end to receive the headed end of a hoop-bolt, and means whereby the bolt may be held behind one or the other of said pairs of projections.

3. In a hoop-coupling, a block having an eye at one end adapted to receive the headed end of a hoop-bolt, said eye consisting of a slot on the under side of said block through which the bolt may be inserted, said slot enlarged in that portion adapted to receive the head, lateral projections on the walls of said enlarged portion between which the body portion of the bolt alone may pass but which bear against the under side of the head and prevent the bolt disengaging from the block when the bolt is drawn forward to its seat, and means by which the threaded end of the bolt may be held upon said block.

4. An adjustable hoop-lug including two separable interlocking members one of said members having a plurality of projections and the other member having a single projection to engage either of the projections of the first-named members, and means upon either of said members for engaging an end of a hoop-bolt.

5. An adjustable hoop-lug including two separable members said members having interlocking projections, and means upon the members for engaging an end of a hoop-bolt.

6. An adjustable hoop-lug including two separable members said members having lugs adapted to interlock said lugs forked to receive the hoop-bolt, and means upon either member for engaging an end of said bolt.

7. A hoop lug or coupling including two members having interlocking forked lugs, each of said members adapted to engage an end of a hoop bolt or rod.

8. A hoop lug or coupling consisting of two members each of which is adapted to engage an end of a hoop bolt or rod, hook projections on each of said members, said projections adapted to interlock on either side of the hoop-bolt.

9. A hoop lug or coupling consisting of two members adapted to engage an end of a hoop bolt or rod, one of said members having a plurality of hook projections engaging on either side of the hoop-rod and complementary hook projections on the other member engaging the hooks on said first member.

10. A hoop lug or coupling consisting of two members, one of said members provided with a perforated end block adapted to embrace the head of the hoop-bolt, a plurality of bifurcated hooks on said member, the other member having an eye in which the other end of the bolt is received and a bifurcated hook projection adapted to engage the hooks on the first member whereby the two members are adjustable in length.

11. A hoop lug or coupling consisting of two members, means upon one of said members by which the eye of the hoop-bolt may be embraced, a plurality of bifurcated hooks or projections on said member, means upon the second member whereby the other end of the bolt is engaged, hook projections on the latter member engaging the hooks of said first member, said interlocking hooks adapted as a knuckle-joint whereby the two members have a limited hinge movement to allow them to adjust themselves to arcs of different radii.

12. The combination with a hoop bolt or rod, of two coupling members, one of said members having an eye portion adapted to embrace the head of the hoop-bolt, a plurality of bifurcated hooks on said member, an eye portion on the second member adapted to engage the other end of the bolt, hooks on the second member engaging the hooks on the first member, said hooks adapted to straddle the hoop-bolt and serving to prevent lateral displacement of the members.

In witness whereof I have hereunto set my hand.

ROBERT B. MOORE.

Witnesses:
S. H. NOURSE,
JESSIE C. BRODIE.